Patented June 30, 1936

2,046,110

UNITED STATES PATENT OFFICE 2,046,110

PROCESS FOR SETTLING AND CLARIFYING LIQUIDS, SEMILIQUIDS, AND PULPS CONTAINING FINELY DIVIDED PARTICLES OF MATTER

Arthur J. Elian, Mexico D. F., Mexico, assignor to Vacuum Process Mineral Extracting Company, Mexico D. F., Mexico, a corporation of Mexico No Drawing. Application September 9, 1933, Serial No. 688,830. In Mexico September 29, 1932

2 Claims. (Cl. 210—1)

This invention relates to a new and useful method of clarifying liquids, semi-liquids and pulps, and has for its object to increase the action on such organic or inorganic matters contained therein and to accelerate the settling thereof. A further object of my invention is to remove entrained gases or air so that the liquids or solutions which contain the solid matters may be made to become practically crystal clear, and also, so that the solid matters may be further treated with re-agents or reactive substances for aiding the settling action or in connection with other processes, such as those employed in the separation of metals from associated chemical, earthy or other matter.

This invention is based essentially upon the principle that all liquids or solutions, containing either organic or inorganic matters, or both, in insoluble form, particularly when said matters are in finely divided state or in a substantially impalpable condition, do not settle solid matter easily or rapidly because the gases dissolved or entrained in the liquid or solution surround the particles of solid matter so as to reduce the total weight thereof and hold them in suspension, notwithstanding that the specific weight of said particles alone is in most instances greater than that of the liquid in which they are suspended or carried.

The presence of such gases not only prevents the rapid and easy settling of the above mentioned particles of matter, but it also forms coverings or insulating coatings which prevent the reactive substances or re-agents used in the treatments of said matters from contacting intimately with said particles to develop freely and completely the physical or chemical actions of said re-agents.

The gases which are entrained within or which form coatings on said particles also affect or alter, by the action of oxidation, both the materials being precipitated and the reactive substances or re-agents used in connection therewith.

To the end of preventing inconveniences and detrimental actions such as those above mentioned, the following process, which is the subject of this invention, is used:

The liquids, semi-liquids or pulps, or solutions in which organic or inorganic matter may be carried or suspended, are first introduced into a vat or tank which can be hermetically closed or sealed. This apparatus is preferably provided with a mechanical agitator of adequate form. The apparatus has an outlet opening above the normal level of the liquid which is connected with a suction or vacuum pump. During the carrying on of the process the agitator is activated and simultaneously therewith or at intermittent periods during the process, a vacuum is formed within the apparatus by means of the suction pump, the suction being produced up to the full capacity of the particular form of pump employed. The vacuum required is a relatively high vacuum such as will produce the desired effect but obviously, is not a perfect vacuum because such are impractical to produce with the best vacuum pumps commonly used in the arts. The use of the term "vacuum" in the present specification and claims is to be understood by one skilled in the art as one that can be produced by common forms of vacuum pumps in order to accomplish the desired effects herein set forth.

After all of the gases that are contained, not only in the apparatus but those entrained by or dissolved in the liquid or semi-liquid, have been extracted, there is introduced into the apparatus, without breaking the vacuum, such clarifying or reactive substances as may be appropriate to produce the further objects which the process is employed to accomplish. The liquid medium when thus made devoid of gases, enables the clarifying or reactive substances to exert their full chemical or physical functions in an unrestricted and complete manner, thereby preventing any undesired oxidations or changes which might otherwise occur during this or other steps, and which changes might have the effect of retarding the clarifying or settling action, especially after the organic or inorganic matters have been exposed to the action of atmosphere during some step in the complete treatment with which my improved process may be employed.

When the above described process has been completed, the vacuum is broken and the liquid, semi-liquid or pulp is preferably transferred to a settling and decanting apparatus where the separation is completely carried out, and wherein the decantation may be accomplished in a rapid and complete manner, because the liquid, semi-liquid or pulp has been deprived of the gases that before the above mentioned operations would maintain the solid particles in suspension, and the same now fall to the bottom aided in part by the action of normal atmospheric pressure.

The above described process may also be carried out either under normal atmospheric temperatures or under the action of additional heat.

Having thus described these features of my invention, I do not wish to be understood as being limited to the details of procedure mentioned therein, for various changes may be made by those skilled in the art that are consistent with the scope of the accompanying claims, without departing from the spirit of my invention.

What I claim and desire to protect by Letters Patent is:—

1. The steps in the process for settling and treating suspended finely divided solid particles of matter from solutions containing the same, which comprise, submitting said solutions to the action of a vacuum or effective partial vacuum, simultaneously agitating the solutions to produce separate motions of said particles and causing reacting substances placed therein to act upon said particles while under said vacuum and while in motion, whereby the action of said reacting substances is accelerated and more perfect chemical or physical changes are produced.

2. The steps in the process for settling and treating suspended finely divided particles of matter from solutions containing the same, which comprise, submitting the same to the action of a vacuum or effective partial vacuum, simultaneously agitating the same to produce separate motions of said particles in said liquid subject to said vacuum, adding reacting substances to said solutions without breaking said vacuum, stopping said currents to permit said particles to settle, and then decanting the clear liquid, whereby entrained gases are extracted therefrom and said particles are more completely and quickly converted into the desired residual products.

ARTHUR J. ELIAN.